United States Patent Office 3,125,486
Patented Mar. 17, 1964

3,125,486
METHOD FOR PREVENTING THE GROWTH OF ALGAE IN SWIMMING POOLS, TANKS, AND THE LIKE
Adolf Schmitz, Essen, Germany, and Alfred Muhr, Zurich, Switzerland, assignors to The Goldschmidt A.G., Essen, Germany
No Drawing. Filed Dec. 5, 1960, Ser. No. 73,515
Claims priority, application Germany July 26, 1960
5 Claims. (Cl. 167—22)

This invention relates to plant growth inhibitors and is particularly concerned with novel algicides and a method for preventing the growth of algae in aqueous systems.

The term "algae" is used in this application in its broadest sense and is deemed to include seaweed, sea moss, sea lettuce, pond scums, stoneworts and other water vegetation.

With the advent and development of outdoor swimming pools, the importance of successfully combatting the growth of algae has significantly increased. As is well known, the growth tendency of algae is very considerable and can rapidly and seriously impair the usefulness of swimming pools, water reservoirs and the like aqueous tank systems.

While algae growth may serve useful purpoess in many instances, it is certainly undesirable in swimming pools and clearwater reservoirs for many obvious reasons.

Algicides presently on the market are primarily of two kinds, i.e. compounds that liberate active chlorine and copper-containing compounds. The former, of which Javelle water and calcium hypochlorite are representative, has serious drawbacks as their storage capacity is very limited. After relatively short periods such compounds tend to decompose and thus lose part of their active chlorine.

Moreover, active chlorine-containing compounds have an unpleasant pungent odor which is offensive to many persons who even may be allergic to chlorine. In concentrated form active chlorine-containing compounds are also dangerous to handle as they are caustic. This, of course, requires precautionary measures in transporting, packaging and handling such compounds, as metal containers and metal parts in any aqueous systems may be readily attacked by corrosion and other undesirable reactions.

Copper compounds, such as copper sulfate, copper carbonate and similar copper salts, on the other hand, exert algicidic activity at only relatively high concentrations, which render the use of such compounds prohibitively expensive.

In addition, copper salts catalytically attack chlorine-containing rubber linings and coatings frequently used in swimming pools, which, of course, limits the usefulness of such compounds.

Recently, quaternery ammonium compounds have been proposed as algicides. These compounds, however, lose a considerable portion of their activity in hard, calcium-containing water. Quaternery amonium compounds, furthermore, lead to irritation of the human skin.

It is a primary object of this invention to provide means of overcoming drawbacks of known algicides and proposing a group of novel algicides which exhibit an excellent algicidic and algistatic activity at low concentrations.

A further object of this invention is to provide means resulting in algicides which may be stored for prolonged periods of time without losing their algicidic and algistatic activity and which are harmless to human beings.

It is also an object of this invention to provide means affording the use of relatively inexpensive algicides which may be conveniently stored in receptacles transported and handled without precautionary measures and which are not subject to corrosion or otherwise attack the confining walls, lining and other structures normally present in swimming pools, water reservoirs tanks and like systems employing aqueous solutions, sea water and the like.

A still further object of this invention is to provide means resulting in a very economical method for combatting, preventing and inhibiting the growth of algae in aqueous systems, which method is superior to others hitherto practiced.

Finally it is an object of this invention to provide means leading to considerable improvements of manufacturing algicides and algicidal methods.

The novel algicides according to this invention having superior algicidic and algistatic characteristics comprise higher alkyl substituted aminocarboxylic acids of the general formula

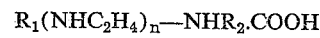

wherein $R_1$ stands for alkyl having 8–18 carbon atoms, $n$ is an integer from 1 to 3 inclusive, and $R_2$ is a bridging member selected from the group consisting of lower alkylene, lower arylene and lower aralkylene. Compounds which are encompassed by this general formula are, for example, dodecylaminoethylglycine, laurylaminoethyl-amonopropionic acid, octyl-di(aminoethyl)aminomethylsalicylic acid and, decyl-tri(aminoethyl)glycine.

Extensive experiments and tests have shown that synthetic ampholyte soaps of this nature corresponding to the formula

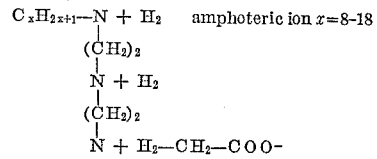

are particularly suitable for the intended purpose.

A compound of this general formula which demands particular attention is dodecyl-di(aminoethyl)-glycine hydrochloride, as it exhibits unusual algicidic activity. The algicides according to this invention are active at exceedingly low concentrations. Thus, at a concentration in water of 1:200,000 algae growth could be successfully prevented. The inventive algicides do not irritate the human skin, even in concentrated form, are colorless, non-corrosive and odorless.

The invention will now be described and explained by several examples. It should be understood, however, that these examples are given by way of illustration and not by way of limitation and that many changes and alterations may be made in regard to quantities, choice of materials and conditions in general without departing from the scope and spirit of this invention, as recited in the appended claims.

Example 1

The algicide solution was prepared by mixing 1 part of dodecyl-di(aminoethyl)-glycine-hydrochloride with 9 parts of a carrier, which in the present example was water. The compound dissolved readily in water and a 10% aqueous solution was thus obtained, 5 kilograms of this solution were added to an outdoor swimming pool containing 100 m.³ of water which corresponds to 100,000 kilograms of water. A second swimming pool of the same volume and containing the same amount of water was used for control purposes, i.e. no algicide was added. After a few days, algae growth in considerable quantities could be observed along the wall surfaces of the control pool, while the test pool remained free from algae. The water in the control pool became finally murky to an extent that it could no longer be used for bathing purposes.

In addition, the walls and the bottom of the control pool became exceedingly slippery. The test pool, on the other hand, remained entirely algae clear for a test period of thirty-two days.

*Example 2*

Example 1 was repeated under identical conditions, but instead of dodecyl-di(aminoethyl)-glycine-hydrochloride, the compound hexadecyl-tri-(aminoethyl)-glycine-hydrochloride was used as active substance. Substantially, the same results as in Example 1 were obtained.

*Example 3*

An algicide solution was prepared by mixing 1 part of dodecyl-aminopropyl-aminobutyric acid, 0.1 part of acetic acid and 9 parts of water. 2.5 kilograms of this solution were added to a filled swimming pool having a capacity of 50 m.³. The water in the pool had been standing for some time before the addition of the algicide and considerable quantities of green algae had thus previously formed. 24 hours after the addition of the algicide, the previously green-colored algae had become discolored to brown, which is a recognized sign of their destruction. No new algae formation could be observed during a test period of 30 days.

*Example 4*

Example 3 was repeated under identical conditions. However, as active ingredient dodecyl-aminoethyl-glycine was used instead. Substantially, the same results as in Example 3 were obtained.

*Example 5*

An algicide solution was prepared by mixing 1 part of octyl-di(aminoethyl)-aminomethyl salicylic acid, 0.1 part of acetic acid and 9 parts of water. 5 kilograms of this mixture were added to a water reservoir containing 100 m.³ of water for industrial purposes. No algae formation occurred for several months.

*Example 6*

Example 5 was repeated under the same conditions. However, tetradecyl-di(aminoethyl)-amino-benzoic acid was employed as active ingredient. Substantially, the same results as in Example 5 were obtained.

*Example 7*

An algicide solution was prepared by mixing 1 part of dodecyl-di(aminoethyl)-aminobutyric acid-hydrochloride with 99 parts of water. The solution thus obtained is added to flowing water by means of an automatic dosage device at a ratio of about 1:1000–1:2000. The flowing water collected in a tank and was intended for industrial purposes.

*Example 8*

Example 7 was repeated under the same conditions. However, dodecyl-di(aminoethyl)-aminopropionic acid-hydrochloride was used as algicide instead. Substantially, the same results were obtained.

It will be realized that the algicidic solution may be administered to the pool or water reservoir automatically by suitable dosage equipment in controlled quantities and at predetermined time intervals.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

Having thus described the invention, what is claimed as new and desired to be secured by Letters Patent, is:

1. The method for inhibiting and preventing algae growth in water, which comprises adding to the water an algicide containing as active ingredient a compound of the formula $$R_1(NHC_2H_4)_n\text{—}NHR_2.COOH$$

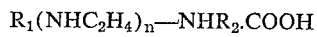

wherein $R_1$ stands for alkyl having 8–18 carbon atoms, $n$ is an integer from 1 to 3 inclusive and $R_2$ is a bridging member selected from the group consisting of lower alkylene, lower arylene and lower aralkylene.

2. The method for inhibiting and preventing algae growth in water, comprising adding to the water an aqueous solution of an algicide containing as active ingredient higher alkyl substituted amino carboxylic acid of the formula $$R_1(NHC_2H_4)_n\text{—}NHR_2.COOH$$

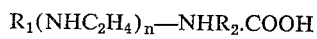

wherein $R_1$ stands for alkyl having 8–18 carbon atoms, $n$ is an integer from 1 to 3 inclusive and $R_2$ is a bridging member selected from the group consisting of lower alkylene, lower arylene and lower aralkylene, and adjusting the ingredient-water ratio to about 1:50000 to 1:400000.

3. The method as set forth in claim 2, wherein said solution is added to the water automatically in predetermined dosages.

4. The method for inhibiting and preventing algae growth in water, which comprises adding to the water an algicide containing as active ingredient a compound selected from the group consisting of dodecyl-di-(aminoethyl)glycine-hydrochloride, hexadecyl-tri-(aminoethyl)-glycine hydrochloride, dodecylaminopropyl-amino butyric acid, dodecyl-aminoethyl glycine, actyl-di(aminoethyl)-amino methyl salicylic acid, tetradecyl-di(aminoethyl)-amino benzoic acid, dodecyl - di - (aminoethyl)-aminobutyric acid-hydrochloride and dodecyl-di-(aminoethyl)-aminopropionic acid.

5. The method as set forth in claim 4, wherein the ratio of ingredient to water is between 1:50000 to 1:400000.

References Cited in the file of this patent

UNITED STATES PATENTS

| | | |
|---|---|---|
| 2,684,946 | Schmitz | July 27, 1954 |
| 2,717,850 | Schmitz | Sept. 13, 1955 |
| 2,840,600 | Du Brow | June 24, 1958 |

FOREIGN PATENTS

| | | |
|---|---|---|
| 792,962 | France | Nov. 7, 1935 |
| 460,372 | Great Britain | Jan. 26, 1937 |